United States Patent [19]

Lilie

[11] Patent Number: 4,820,407

[45] Date of Patent: Apr. 11, 1989

[54] SOLIDS SCREENS

[75] Inventor: Kenneth R. Lilie, Houston, Tex.

[73] Assignee: CPI Sales, Inc.

[21] Appl. No.: 42,469

[22] Filed: Apr. 24, 1987

[51] Int. Cl.$^4$ .............................................. B07B 1/46
[52] U.S. Cl. ................................... 209/397; 209/274; 209/401; 210/499
[58] Field of Search ............... 209/392, 397, 400, 401, 209/403–405, 261, 266, 264, 274, 275, 254, 240; 210/499

[56] References Cited

U.S. PATENT DOCUMENTS

| 948,222 | 2/1910 | Honabach | 209/397 |
|---|---|---|---|
| 1,082,612 | 12/1913 | Smith et al. | 209/397 |
| 1,142,434 | 8/1915 | James | 209/397 |
| 2,314,880 | 3/1943 | Heller | 209/400 |
| 4,247,007 | 1/1981 | Kal | 209/400 |
| 4,691,744 | 8/1987 | Haver et al. | 210/499 |

FOREIGN PATENT DOCUMENTS

| 31477 | of 1910 | Fed. Rep. of Germany | 209/397 |
|---|---|---|---|
| 1049670 | 1/1959 | Fed. Rep. of Germany | 209/397 |
| 736190 | 9/1955 | United Kingdom | 209/401 |

Primary Examiner—James B. Marbert
Assistant Examiner—Donald T. Hajec
Attorney, Agent, or Firm—David M. Ostfeld

[57] ABSTRACT

A new and unique pattern and use of flexible ribs on a solids filtering screen, such as those used in drilling wells for hydrocarbons and other substances, in conjunction with a coordinated system for hanging such screens and directing the flow of trapped solids over the surface of such screens, is disclosed. The invention counteracts the tendency of trapped solids to migrate to and congregate in the lowest areas of a suspended screen, and therefore the invention reduces the incidence of screen tearing and increases the flow rate through the screen.

4 Claims, 2 Drawing Sheets

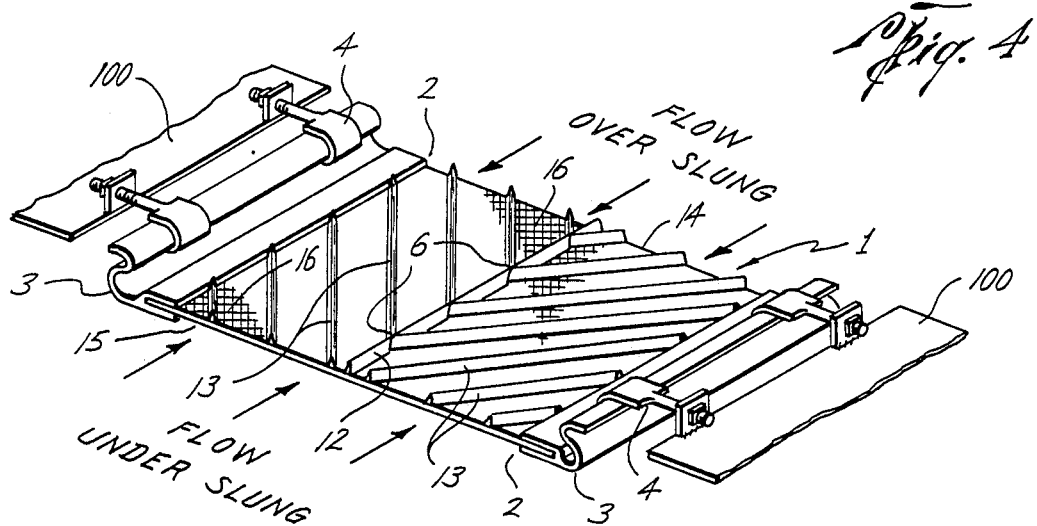
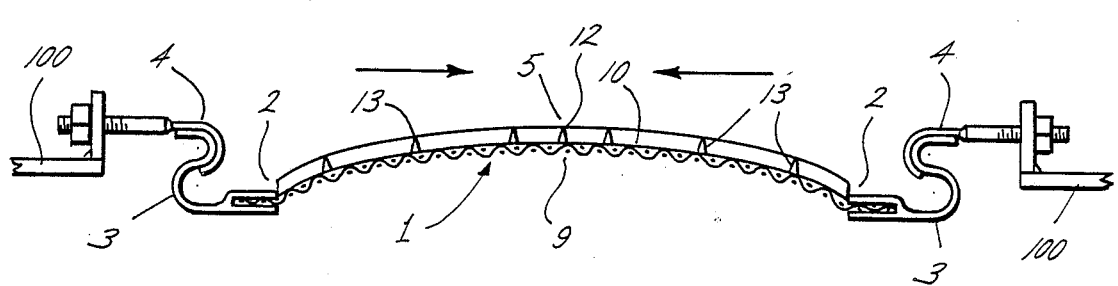
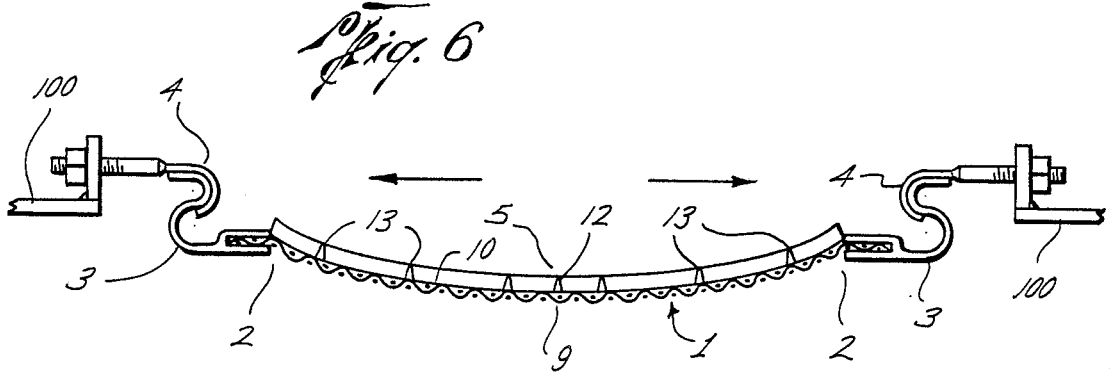

SOLIDS SCREENS

TECHNICAL FIELD

The invention relates to screens used to filter and control solids, such as screens used to remove solids from drilling mud used in drilling wells such as hydrocarbon wells. More specifically, the invention relates to a design for the flexible ribs of such filtering screens which reduces the build-up of solids on particular areas of the screen, which build-up would otherwise reduce flow rate and increase the propensity of the screen to tear or rip.

BRIEF DESCRIPTION OF THE DRAWINGS

To best illustrate and describe the nature and objects of the present invention, it is necessary to make reference, in the statement of "Background Art" which follows immediately hereafter as well as in the "Detailed Description of the Invention", to the drawings. Therefore, the drawings are briefly described here along with a brief description of pertinent parts, each of which is given the same reference number in all the drawings in which such part appears:

FIG. 4 is the same illustration as FIG. 1, except that screen 1 is shown embodying the present invention as described herein;

FIG. 5 is a horizontal and lateral view of screen 1 in an "over slung" position, describing the effect of the present inventon on the lateral flow of solids on the top surface of screen 1; and FIG. 6 is a horizontal and lateral view of screen 1 in an "under slung" position, describing the effect of the present invention on the lateral flow of solids on the top surface of screen 1.

BACKGROUND ART

Figure 1:
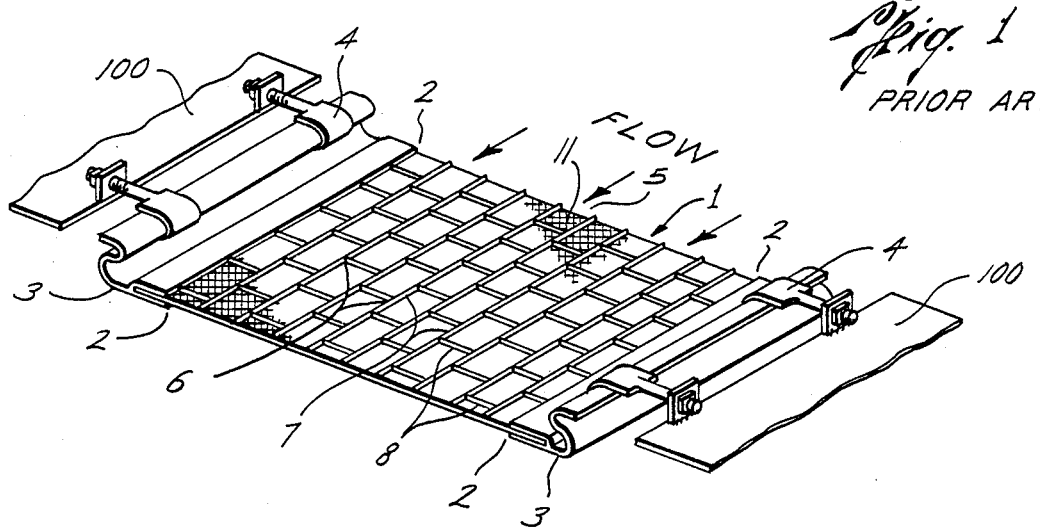
FIG. 1 is a depiction of a screen 1 as typically constructed in the prior art, viewed from above. The screen 1 is hung or suspended as follows: the two opposite longitudinal edges 2 of screen 1 are tightly held along their entire lengths by hooking clasps 3, which in turn are inserted into hooks 4 in order to hang or suspend screen 1.

The need for solids control, such as in conjunction with the use of drilling mud in hydrocarbon well drilling, has long been known in the prior art. Drilling mud, typically a mixture of clay and water and various additives, is pumped through the hollow drill string (pipe, drill collar, bit, etc.) down into the well and is ejected through holes in the drillbit. Among other functions, the mud picks up cuttings (rock bits) and other solids from the bottom of the well and carries these solids away from the bit as the mud is pumped upward and out of the well in the space between the well walls and the drill string. At the top of the well, the solids-laden mud is directed to the shale shaker, a device consisting essentially of a series of screens which catch and remove the solids from the mud as the mud passes through the screens. As indicated in FIG. 1, each screen is caused to vibrate by vibratory equipment generally shown by the indicates 100 in such a manner as to create a longitudinal flow of trapped solids in either direction on the top surface of the screen for removal and disposal of the solids. This filtering, along with other cleaning processes, allows the mud to be reused.

Figure 2:
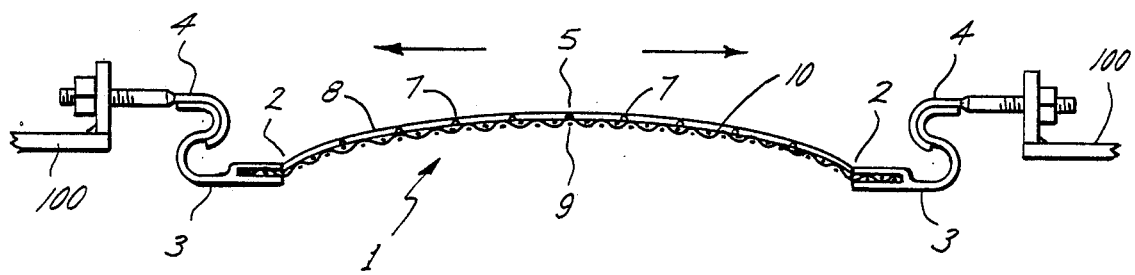
FIG. 2 is a horizontal and lateral view of screen 1 in an "over slung" position as explained below, describing the lateral flow of solids on the top surface of screen 1 as constructed using prior art.
Figure 3:
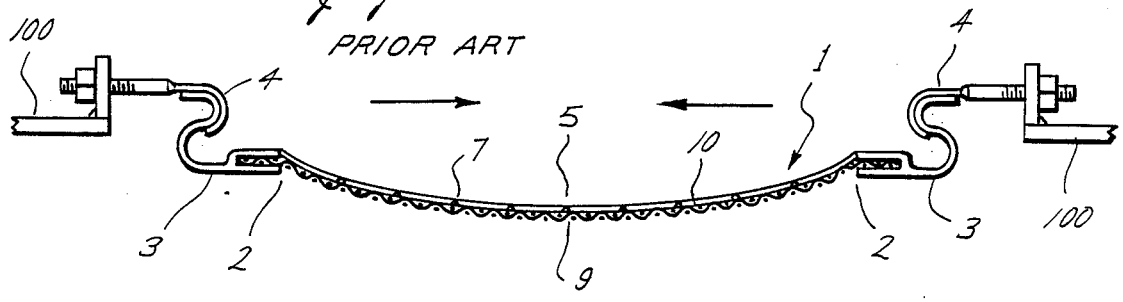
FIG. 3 is a horizontal and lateral view of screen 1 in an "under slung" position as explained below, describing the lateral flow of solids on the top surface of screen 1 as constructed using prior art.

The fineness or coarseness of the mesh of a screen may vary depending upon such factors as flow rate and the size of the solids to be filtered by the screen. The finer the mesh, the higher is the propensity of the screen to tear. Referring now to the drawings, this propensity to tear is further increased by the tendency of solids trapped by the screen 1 to laterally migrate (by the vibration of the screen) to and congregate at the lowest parts of the screen 1, which is suspended as shown in FIG. 1. It is virtually impossible to hang a screen 1 so that the lateral plane of its surface is perfectly horizontal; rather, either the center 5 of screen 1 bulges upward laterally from the longitudinal edges 2 of screen 1 as shown in FIG. 2, in which case the screen is said to be "over slung", or the center 5 bulges downward as shown in FIG. 3, in which case the screen 1 is said to be "under slung". If screen 1 is over slung (FIG. 2), solids tend to congregate at the longitudinal edges 2; if screen 1 is under slung (FIG. 3), solids tend to congregate at center 5.

Screen 1 may comprise a single layer or, as shown in FIGS. 2, 3, 5, and 6 for illustration, two or more layers, the bottom screen layer 9 having a coarser, stronger mesh to provide support for one or more top screen layers 10 which are primarily responsible for the solids filtering function. Top screen layer(s) 10, being of a finer mesh, is the more prone to tearing.

As a means to limit screen tearing and to otherwise strengthen and support screen 1 and to hold screen layers 9 and 10 together, it is known in the prior art to construct screens with flexible ribs 6 of polypropylene or similar material. As shown in FIG. 1, these ribs 6, which generally vary in width from 3/16 inch to 5/16 inch, generally comprise a set of longitudinal ribs 7 running the entire length of screen 1 (paralleling longitudinal edges 2), and shorter lateral ribs 8 running between and perpendicular to adjacent longitudinal ribs 7, spaced at regular intervals. Each set of lateral ribs 8 running between the same two longitudinal ribs 7 is staggered with adjacent sets of lateral ribs 8, thereby creating a brickwork pattern of ribs 6. Ribs 6 are of approximately the same thickness as the screen 1 itself (approximately 0.036 inch) and enclose the full thickness of both bottom screen layer 9 and top screen layer(s) 10. The intersecting of longitudinal ribs 7 and lateral ribs 8 create panels 11 of screen; a tear in top screen layer(s) 10 beginning in any particular screen panel 11 is prevented from spreading to adjacent screen panels 11 by the ribs 6 that form the edges of the panel 11 in which the tear occurs.

It is an object of this invention to teach a different pattern of ribs 6 which counteracts the tendency of trapped solids to flow laterally to the lowest parts of a suspended screen. The present invention thereby reduces the incidence of screen tearing, increases the filtering surface area of the screen, and enhances the longitudinal flow of trapped solids across the top surface of the screen.

DISCLOSURE OF THE INVENTION

The invention comprises a new and unique pattern of flexible ribs of a filtering screen, comprising a single center longitudinal rib running the entire longitudinal length of the screen and two opposing sets of diagonal ribs, each set comprising a series of equally spaced and parallel ribs beginning at a longitudinal edge of the screen and extending diagonally and laterally to the center longitudinal rib, and each set essentially mirroring the other set of diagonal ribs. The ribs are slightly raised above the surface of the screen so as to direct the flow of solids over the surface of the screen. A screen incorporating the present invention is so hung or suspended as to be intentionally over slung or under slung, and the longitudinal flow of solids over the screen is so directed that such flow is always in the same longitudinal direction as the direction of the diagonal ribs from their nearest end longitudinally (in relation to the direction of the flow) to their farthest end longitudinally.

DETAILED DESCRIPTION OF THE INVENTION

Reference numerals 2, 3, 4 and 100 and the parts thereof have the same meaning for FIGS. 4-6 as they do for FIGS. 1-3. Accordingly, screen 1 has edges 2 connected to hooking clasp 3. Hooking clasps members are engaged by clamps 4 to vibratory equipment generally shown by the reference numeral 100. Referring now to FIG. 5, the pattern of ribs 6 as taught by this invention comprises a single longitudinal center rib 12 extending the full length of screen 1 and, on either side of center rib 12, a set of diagonal ribs 13. Each set of diagonal ribs 13 comprises a series of equally spaced and parallel diagonal ribs 13, each rib 13 beginning laterally at the longitudinal edge 2 corresponding to such set of diagonal ribs 13 and extending diagonally to center rib 12. (At the lateral edges 14 and 15 of screen 1, some diagonal ribs 13 are cut off before actually reaching longitudinal edges 2 or center rib 12 or imaginary extensions thereof, but otherwise are situated the same as and are parallel to full diagonal ribs 13.) For each diagonal rib 13 of one set of diagonal ribs 13, there is a corresponding and mirroring diagonal rib 13 of the other set of diagonal ribs 13, beginning at the other longitudinal edge 2 and extending diagonally and laterally in the same longitudinal direction and ending at the same point on center rib 12 as its corresponding diagonal rib 13 of the other set of diagonal ribs 13. Unlike the prior art, the thickness of ribs 12 and 13 is greater than the thickness of screen 1 (whether comprising a single layer or multiple layers), and so in addition to fully enclosing the thickness of bottom screen layer 9 and top screen layer(s) 10, ribs 12 and 13 are slightly raised above the top surface of screen 1, such as 0.007 inch above said surface. (Optionally, the entire screen 1 may be bordered with ribs 6 of like construction in order to strengthen the screen 1.)

Also unlike the prior art, a screen 1 so incorporating the present invention is intentionally either over slung (FIG. 5) or under slung (FIG. 6). If screen 1 is over slung, then, referring to FIG. 4, the longitudinal flow of trapped solids is directed over the top surface of screen 1 from the far lateral end 14 longitudinally of screen 1 to the near lateral end 15. Because ribs 12 and 13 form a slightly raised barrier in relation to top screen layer(s) 10, diagonal ribs 13 tend to cause trapped solids to move laterally from longitudinal edges 2 to center 5 of screen 1, thereby counteracting the tendency of solids to congregate at longitudinal edges 2 of an over slung screen (FIG. 5). If, on the other hand, screen 1 is under slung, then, again referring to FIG. 4, the longitudinal flow of trapped solids is directed from near lateral end 15 of screen 1 to far lateral end 14, in which case diagonal ribs 13 tend to cause trapped solids to move laterally from center 5 to longitudinal edges 2, thereby counteracting the tendency of solids to congregate at center 5 of an under slung screen (FIG. 6).

The embodiment of the present invention as explained above causes a significantly more even spread of trapped solids on the top surface of screen 1, thereby reducing the incidence of screen tearing at areas of screen 1 where solids would otherwise tend to congregate. Also, the more even spreading of trapped solids allows a greater flow through screen 1 for two reasons: (1) there is less surface blockage caused by congregating solids, and (2) the longitudinal flow of trapped solids over and off screen 1 is enhanced by the absence of perpendicular lateral barriers such as the lateral ribs 8 in the prior art and by the longitudinal direction of the diagonal flow of trapped solids caused by diagonal ribs 13. Moreover, screen 1 is still divided into panels 16 to limit tearing.

Other and varying embodiments and uses of the inventive concept taught herein are possible, and therefore the details herein are to be interpreted as illustrative and not in a limiting sense.

What is claimed is:

1. A screen assembly for solids filtering for connection to vibratory equipment, having hooks connected to the vibratory equipment, to direct the flow of trapped solids in a given direction, comprising:
    a screen having longitudinal edges;
    hooking clasps connected at a first end to the hooks and at a second end to one of said longitudinal edges; said screen including:
        a screen layer having a longitudinal center and said longitudinal edges;
        a set of flexible ribs, said ribs covering a portion of said screen layer and including two opposing sets of diagonal ribs, each set having a series of spaced ribs beginning at said longitudinal edges of said screen layer and extending diagonally and laterally toward said longitudinal center, each rib converging with its corresponding rib of the opposite set of said diagonal ribs to form a chevron;
    wherein said screen layer is overslung and the longitudinal direction of the flow of trapped solids across said screen layer is the same as the longitudinal direction of each said diagonal rib from its end at said longitudinal edge toward said longitudinal center.

2. A screen assembly for solids filtering for connection to vibratory equipment, having hooks connected to the vibratory equipment, to direct the flow of trapped solids in a given direction, comprising:
    a screen having longitudinal edges;
    hooking clasps connected at a first end to the hooks and at a second end to one of said longitudinal edges; said screen including:
        a screen layer having a longitudinal center and said longitudinal edges;
        a set of flexible ribs, said ribs covering a portion of said screen layer and including two opposing sets of diagonal ribs, each set having a series of spaced ribs beginning at said longitudinal edges of said screen layer and extending diagonally and laterally toward said longitudinal center, each rib converging with its corresponding rib of the opposite set of said diagonal ribs to form a chevron;

wherein said screen layer is underslung and the longitudinal direction of flow of trapped solids across said screen layer is the same as the longitudinal direction of each layer is the same as the longitudinal direction of each such diagonal rib from its end toward said longitudinal center to its end at said longitudinal edges.

3. A screen assembly for solids filtering for connection to vibratory equipment, having hooks connected to the vibratory equipment, to direct the flow of trapped solids in a given direction, comprising:

a screen having longitudinal edges;

hooking clasps connected at a first end to the hooks and at a second end to one of said longitudinal edges; said screen including:

a screen layer having a longitudinal center and said longitudinal edges;

a set of flexible ribs, said ribs covering a portion of said screen layer and including two opposing sets of diagonal ribs, each set having a series of spaced ribs beginning at said longitudinal edges of said screen layer and extending diagonally and laterally toward said longitudinal center, each rib converging with its corresponding rib of the opposite set of said diagonal ribs to form a chevron;

wherein said set of flexible ribs includes a center longitudinal rib running substantially the entire longitudinal length of said screen layer and each of said diagonal ribs begins at said edges of said screen layer and extends diagonally and laterally to said center longitudinal rib, and wherein said screen layer is overslung and the longitudinal direction of the flow of trapped solids across said screen layer is the same as the longitudinal direction of each said diagonal rib from its end at said longitudinal edge to its end at said center longitudinal rib.

4. A screen assembly for solids filtering for connection to vibratory equipment, having hooks connected to the vibratory equipment, to direct the flow of trapped solids in a given direction, comprising:

a screen having longitudinal edges;

hooking clasps connected at a first end to the hooks and at a second end to one of said longitudinal edges; said screen including:

a screen layer having a longitudinal center and said longitudinal edges;

a set of flexible ribs, said ribs covering a portion of said screen layer and including two opposing sets of diagonal ribs, each set having a series of spaced ribs beginning at said longitudinal edges of said screen layer and extending diagonally and laterally toward said longitudinal center, each rib converging with its corresponding rib of the opposite set of said diagonal ribs to form a chevron;

wherein said set of flexible ribs includes a center longitudinal rib running substantially the entire longitudinal length of said screen layer and each of said diagonal ribs begins at said edges of said screen layer and extends diagonally and laterally to said center longitudinal rib; and wherein said screen layer is underslung and the longitudinal direction of the flow of trapped solids across said screen layer is the same as the longitudinal direction of each said diagonal rib from its end at said center longitudinal rib to its end at said longitudinal edges.

* * * * *